United States Patent
Kobashi et al.

(10) Patent No.: US 10,635,112 B2
(45) Date of Patent: Apr. 28, 2020

(54) CONTROL SYSTEM FOR WORK VEHICLE, WORK VEHICLE, AND CONTROL METHOD FOR WORK VEHICLE

(71) Applicant: Komatsu Ltd., Tokyo (JP)

(72) Inventors: Yuji Kobashi, Tokyo (JP); Kenta Osagawa, Tokyo (JP); Isao Toku, Tokyo (JP); Tomonori Ozaki, Tokyo (JP)

(73) Assignee: KOMATSU LTD, Tokyo (JP)

( * ) Notice: Subject to any disclaimer, the term of this patent is extended or adjusted under 35 U.S.C. 154(b) by 198 days.

(21) Appl. No.: 15/735,735

(22) PCT Filed: Mar. 31, 2017

(86) PCT No.: PCT/JP2017/013859
§ 371 (c)(1),
(2) Date: Dec. 12, 2017

(87) PCT Pub. No.: WO2017/171089
PCT Pub. Date: Oct. 5, 2017

(65) Prior Publication Data
US 2018/0284784 A1    Oct. 4, 2018

(51) Int. Cl.
*G05D 1/02* (2020.01)
*G08G 1/0968* (2006.01)
*E02F 9/20* (2006.01)

(52) U.S. Cl.
CPC ......... *G05D 1/0212* (2013.01); *E02F 9/2045* (2013.01); *G05D 1/0274* (2013.01);
(Continued)

(58) Field of Classification Search
CPC .............. G05D 1/0212; G05D 1/0278; G05D 2201/0202; G05D 2201/021
See application file for complete search history.

(56) References Cited

U.S. PATENT DOCUMENTS

| | | | |
|---|---|---|---|
| 9,037,338 B2 | 5/2015 | Osagawa et al. | |
| 2015/0310674 A1* | 10/2015 | Humphrey | H04W 4/029 701/24 |
| 2017/0285655 A1 | 10/2017 | Katou et al. | |

FOREIGN PATENT DOCUMENTS

| AU | 2015344388 A1 | 4/2017 |
|---|---|---|
| CA | 2960470 A1 | 5/2016 |

(Continued)

OTHER PUBLICATIONS

"Wide Load Regulations, Rules, Flags and Permit Costs by State", all pages, retrieved Aug. 26, 2019, publication date Unknown. (Year: 2019).*

(Continued)

Primary Examiner — Calvin Cheung
(74) Attorney, Agent, or Firm — Locke Lord LLP

(57) ABSTRACT

A control system for a work vehicle includes a course data generation unit that generates a traveling condition including a traveling route of the work vehicle in a workplace, a service area setting unit that sets a service area which is an area where the work vehicle is serviceable, a passage area setting unit that sets a passage area having a predetermined width along the traveling route generated by the course data generation unit, and an update data generation unit that generates update data for service area data obtained by expanding the service area when the passage area is present on an outer side of the service area.

6 Claims, 6 Drawing Sheets

(52) U.S. Cl.
CPC ..... *G05D 1/0297* (2013.01); *G08G 1/096822* (2013.01); *G05D 1/0278* (2013.01); *G05D 2201/021* (2013.01); *G05D 2201/0202* (2013.01)

(56) References Cited

FOREIGN PATENT DOCUMENTS

| | | |
|---|---|---|
| JP | 2005-069714 A | 3/2005 |
| JP | 2012-113429 A | 6/2012 |
| JP | 2016-090864 A | 5/2016 |
| JP | 2017-049172 A | 3/2017 |
| WO | 2014/097445 A1 | 6/2014 |
| WO | 2016/072329 A1 | 5/2016 |

OTHER PUBLICATIONS

International Search Report dated May 16, 2017, issued for PCT/JP2017/013859.
Office Action dated Nov. 16, 2018, issued for the corresponding Canadian patent application No. 2,992,244.
Office Action dated Jan. 23, 2018, issued for the corresponding Australian oatent application No. 2017241973.

* cited by examiner

CONTROL SYSTEM FOR WORK VEHICLE, WORK VEHICLE, AND CONTROL METHOD FOR WORK VEHICLE

FIELD

The present invention relates to a control system for a work vehicle, a work vehicle, and a control method for a work vehicle.

BACKGROUND

In a wide-area work site like a mine, a work vehicle traveling unattended is used for transport work. After a cargo is loaded by a loading machine at a loading ground, the work vehicle travels on a conveying path to move to a drainage ground and discharges the cargo at the drainage ground.

CITATION LIST

Patent Literature

Patent Literature 1: Japanese Laid-open Patent Publication No. 2012-113429 A

SUMMARY

Technical Problem

As the work by the loading machine and so on progresses, the topography of the loading ground varies and an area where the work vehicle can serve varies in some cases. In this case, if a serviceable area is measured again by a surveying vehicle, the service of the loading machine and the work vehicle needs to be stopped during that time. It is thus required to suppress a decrease in productivity at a work site.

The present invention has been made in view of the above problems and it is an object of the present invention to suppress a decrease in productivity at a work site.

Solution to Problem

According to an embodiment of the present invention, a control system for a work vehicle, comprises: a course data generation unit that generates a traveling condition including a traveling route of the work vehicle in a workplace; a service area setting unit that sets a service area which is an area where the work vehicle is serviceable; a passage area setting unit that sets a passage area having a predetermined width along the traveling route generated by the course data generation unit; and an update data generation unit that generates update data for the service area data obtained by expanding the service area when the passage area is present on an outer side of the service area.

Advantageous Effects of Invention

According to a mode of the present invention, a decrease in productivity at a work site can be suppressed.

DESCRIPTION OF EMBODIMENTS

Hereinafter, embodiments according to the present invention will be described with reference to the drawings, but the present invention is not limited thereto. Constituent elements of the embodiments described below can be appropriately combined. In addition, some constituent elements are not used in some cases.

[Management System]

Figure 1:
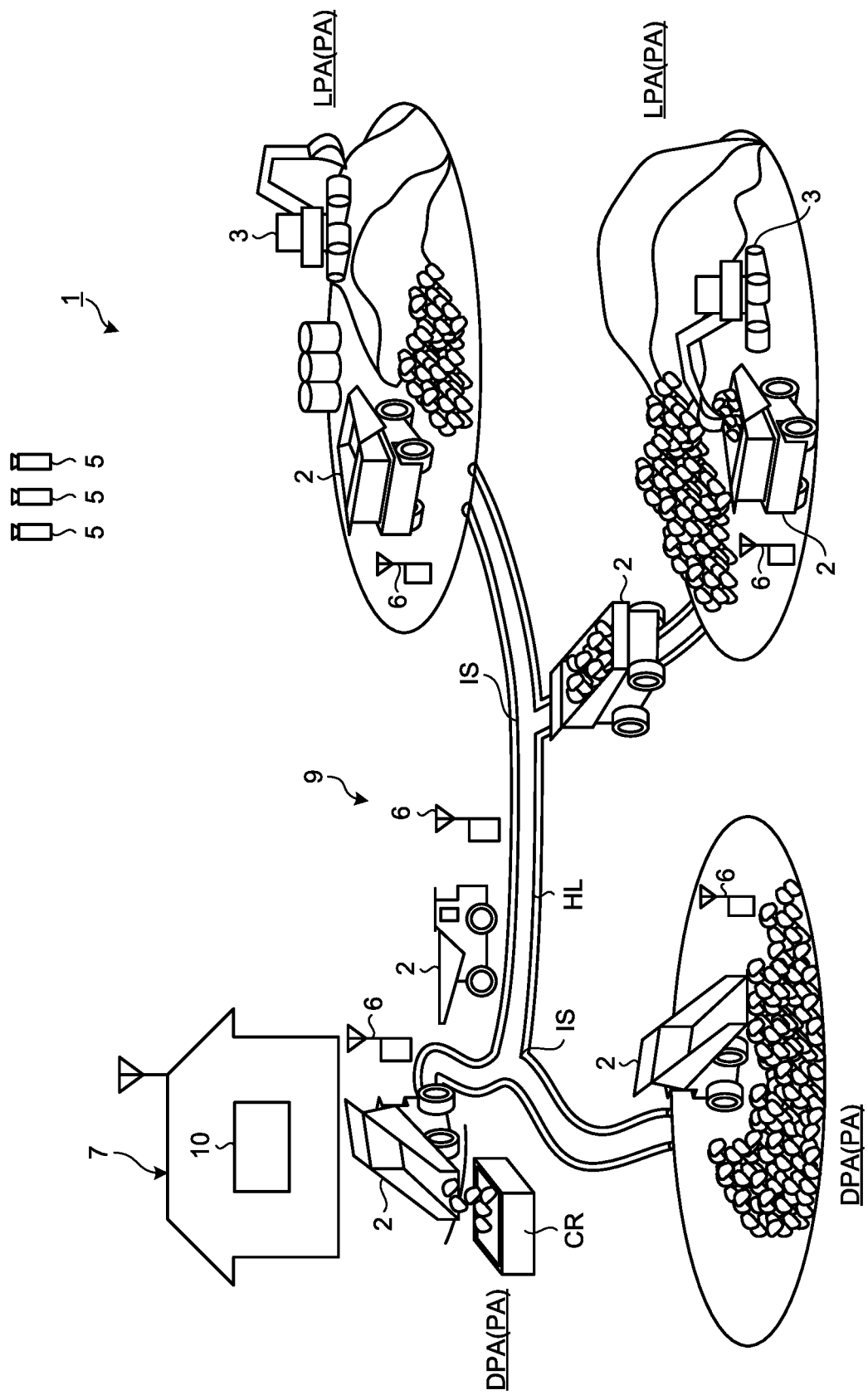
FIG. 1 is a diagram schematically illustrating an example of a management system for a work vehicle according to the present embodiments.

A management system 1 for a work vehicle 2 according to the present embodiment will be described. FIG. 1 is a diagram schematically illustrating an example of the management system 1 for the work vehicle 2 according to the present embodiment. The management system 1 carries out operation management of the work vehicle 2. In the present embodiment, the work vehicle 2 is a dump truck 2 which is a transport vehicle capable of traveling through a mine.

As illustrated in FIG. 1, the dump truck 2 travels through a workplace PA in a mine and at least a part of a conveying path HL leading to the workplace PA. The workplace PA includes at least one of a loading ground LPA and a drainage ground DPA. The conveying path HL includes an intersection IS. The dump truck 2 travels in accordance with a traveling route TR (refer to FIG. 4 and the like) set for the conveying path HL and the workplace PA.

The loading ground LPA is an area where loading work for loading a cargo on the dump truck 2 is carried out. A loading machine 3 such as an excavator serves at the loading ground LPA. The loading machine 3 includes a control device 60 (refer to FIG. 3) described later. The drainage ground DPA is an area where discharge work for discharging the cargo from the dump truck 2 is carried out. For example, a crusher CR is provided in the drainage ground DPA.

The management system 1 includes a management device 10 and a communication system 9. The management device 10 includes a computer system and is installed in a control facility 7 provided in a mine. The communication system 9 carries out data communication and signal communication between the management device 10 and the dump truck 2. The communication system 9 has a plurality of repeaters 6 that relay data and signals. The management device 10 and the dump truck 2 wirelessly communicate via the communication system 9.

In the present embodiment, the dump truck 2 is an unmanned dump truck which travels unattended without any operation by a driver. The dump truck 2 travels through a mine based on a command signal from the management device 10.

In the present embodiment, the position of the dump truck 2 is detected using a global navigation satellite system (GNSS). The global navigation satellite system includes a global positioning system (GPS). The GNSS has a plurality of positioning satellites 5. The GNSS detects a position defined by coordinate data constituted by latitude, longitude, and altitude. The position detected by the GNSS is an absolute position defined in a global coordinate system. The absolute position of the dump truck 2 at the mine is detected by the GNSS.

[Dump Truck]

Figure 2:
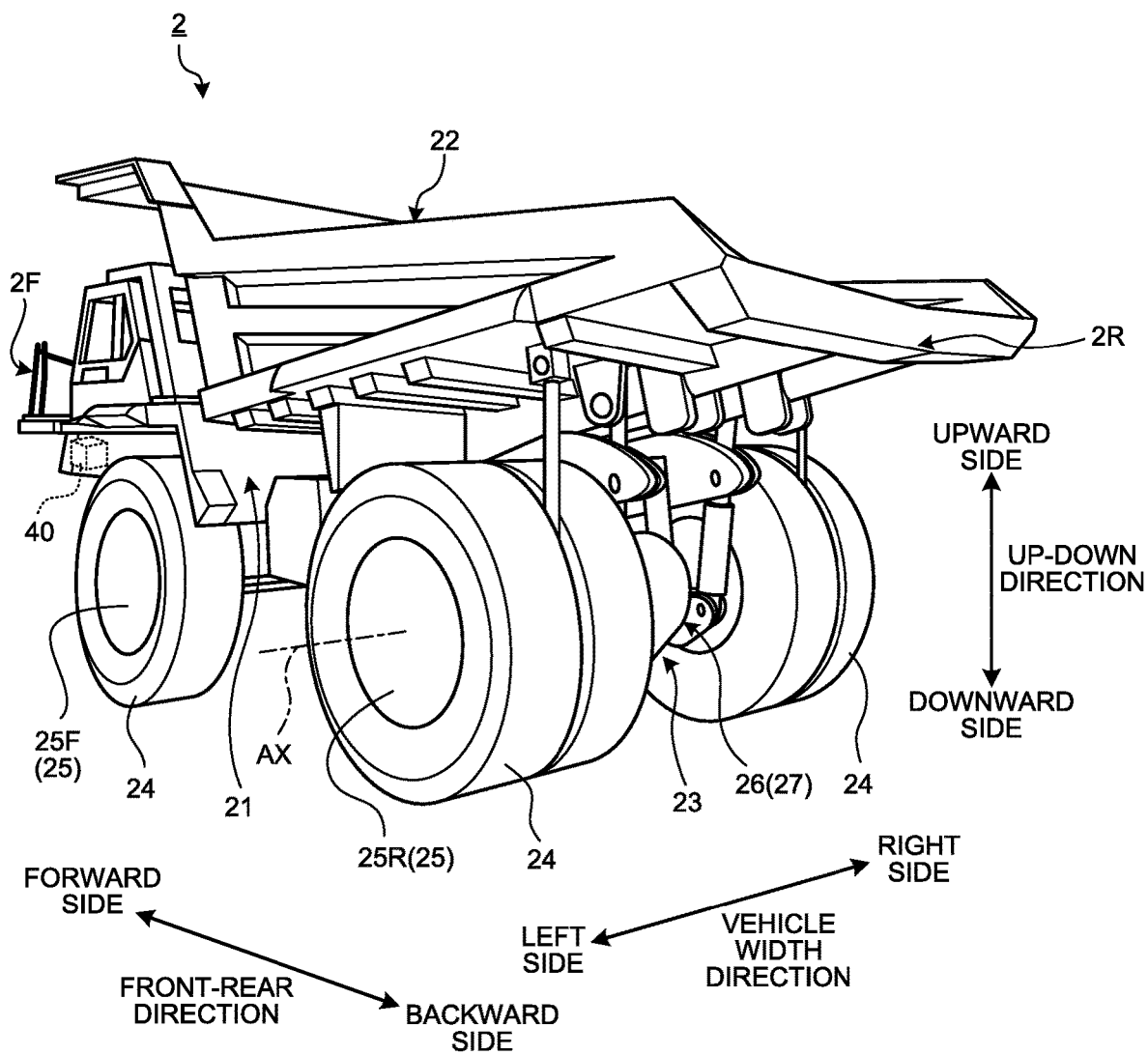
FIG. 2 is a perspective view of a dump truck according to the present embodiments as viewed from the rear.

Next, the dump truck 2 according to the present embodiment will be described. FIG. 2 is a perspective view of the dump truck 2 according to the present embodiment as viewed from the rear. As illustrated in FIG. 2, the dump truck 2 includes a vehicle body frame 21, a dump body 22 supported by the vehicle body frame 21, a traveling device 23 that travels while supporting the vehicle body frame 21, and a control device 40.

The traveling device 23 has wheels 25, on each of which a tire 24 is mounted. The wheels 25 include a front wheel 25F and a rear wheel 25R. The front wheel 25F is steered by a steering device 33 (refer to FIG. 3). The rear wheel 25R is not steered. The wheel 25 rotates about a rotation shaft AX.

In the following description, a direction parallel to the rotation shaft AX of the rear wheel 25R is appropriately referred to as vehicle width direction, an advancing direction of the dump truck 2 is appropriately referred to as a front-rear direction, and a direction orthogonal to both of the vehicle width direction and the front-rear direction is appropriately referred to as an up-down direction.

One side of the front-rear direction is a forward side and a direction opposite to the forward side is a backward side. One side of the vehicle width direction is a right side and a direction opposite to the right side is a left side. One side of the up-down direction is an upward side and a direction opposite to the upward side is a downward side. The front wheel 25F is disposed on the forward side of the rear wheel 25R. The front wheels 25F are disposed on both sides in the vehicle width direction. The rear wheels 25R are disposed on both sides in the vehicle width direction. The dump body 22 is disposed on the upward side of the vehicle body frame 21.

The vehicle body frame 21 supports a driving device 31 (refer to FIG. 3) that produces a driving force for driving the traveling device 23. The dump body 22 is a member on which a cargo is placed.

The traveling device 23 has a rear axle 26 that transfers the driving force produced by the driving device 31 to the rear wheel 25R. The rear axle 26 includes an axle 27 that supports the rear wheel 25R. The rear axle 26 transfers the driving force produced by the driving device 31 to the rear wheel 25R. The rear wheel 25R rotates about the rotation shaft AX by the driving force supplied from the rear axle 26. As a result, the traveling device 23 travels.

The dump truck 2 is capable of a forward movement and a backward movement. The forward movement means traveling while a front portion 2F of the dump truck 2 faces the advancing direction. The backward movement means traveling while a rear portion 2R of the dump truck 2 faces the advancing direction.

The control device 40 controls the dump truck 2. The control device 40 can control the dump truck 2 based on a command signal transmitted from the management device 10.

[Control System of Work Vehicle]

Figure 3:
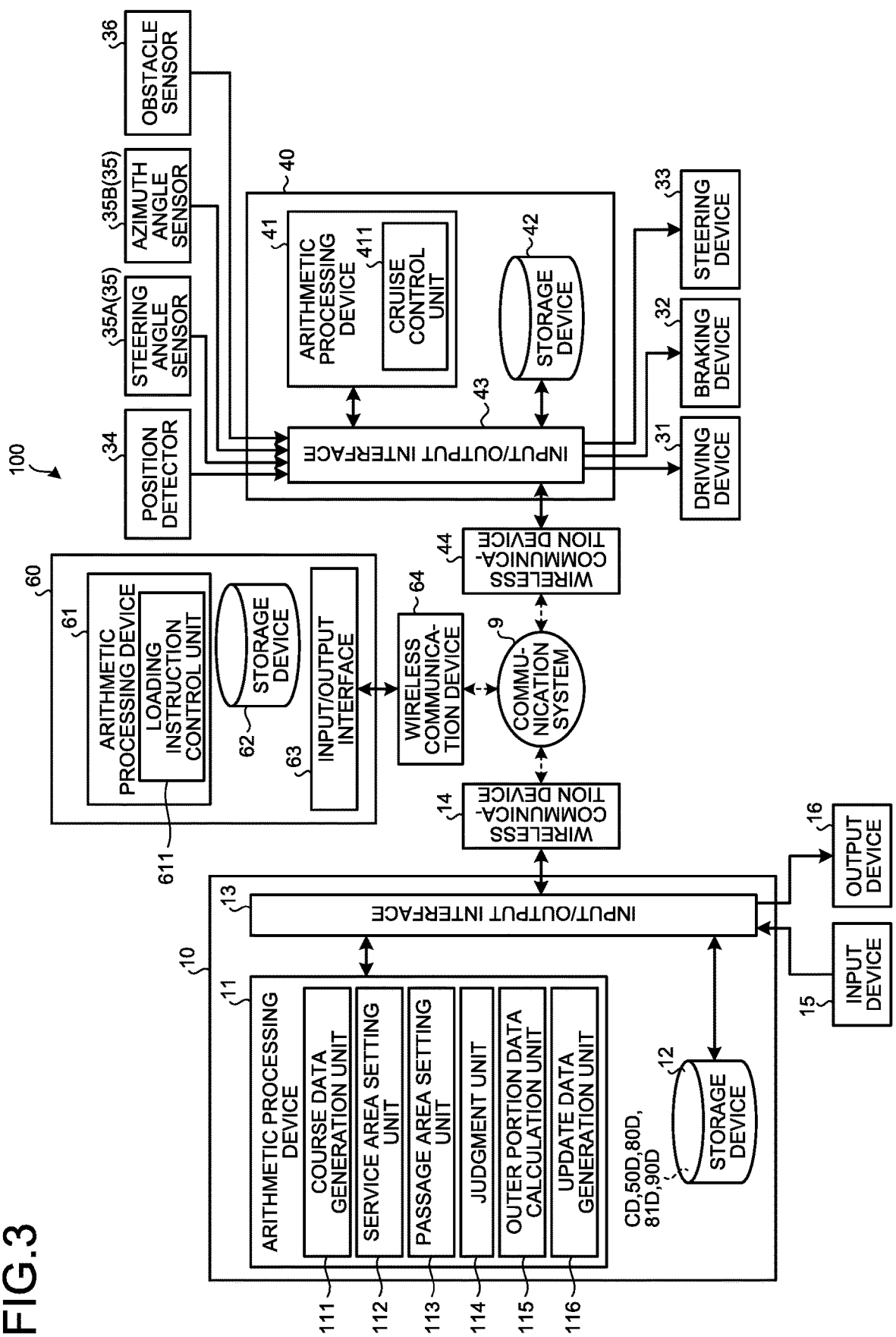
FIG. 3 is a functional block diagram illustrating an example of a management device and control devices according to the present embodiments.

Next, a control system 100 for a work vehicle according to the present embodiment will be described. The control system 100 has the management device 10, the control device 40 of the dump truck 2, and the control device 60 of the loading machine 3. FIG. 3 is a functional block diagram illustrating an example of the management device 10, the control device 40, and the control device 60 according to the present embodiment. The management device 10 is installed in the control facility 7. The control device 40 is equipped in the dump truck 2. The management device 10 and the control device 40 wirelessly communicate via the communication system 9.

The management device 10 includes a computer system. The management device 10 has an arithmetic processing device 11 including a processor such as a central processing unit (CPU), a storage device 12 including a memory and a storage such as a read only memory (ROM) or a random access memory (RAM), and an input/output interface 13.

The management device 10 is connected to a wireless communication device 14. The wireless communication device 14 is disposed in the control facility 7. The management device 10 communicates with the dump truck 2 via the wireless communication device 14 and the communication system 9.

The management device 10 is connected to an input device 15 and an output device 16. The input device 15 and the output device 16 are installed in the control facility 7. The input device 15 includes, for example, at least one of a keyboard, a mouse, and a touch panel for a computer. Input data generated by operating the input device 15 is output to the management device 10. The output device 16 includes a display device. The display device includes a flat panel display such as a liquid crystal display (LCD) or an organic electroluminescence display (OELD). The output device 16 functions based on display data output from the management device 10. Note that the output device 16 may be, for example, a printing device.

The arithmetic processing device 11 has a course data generation unit 111, a service area setting unit 112, a passage area setting unit 113, a judgment unit 114, an outer portion data calculation unit 115, and an update data generation unit 116.

The course data generation unit 111 generates course data CD indicating a traveling condition for the dump truck 2 traveling through the mine. The traveling condition for the dump truck 2 includes at least one of the traveling route TR (refer to FIG. 4), a traveling speed, acceleration, deceleration, and a traveling direction of the dump truck 2. The traveling condition for the dump truck 2 also includes at least one of a stopping position and a departure position of the dump truck 2. The course data generation unit 111 stores the generated course data CD to the storage device 12.

Figure 4:
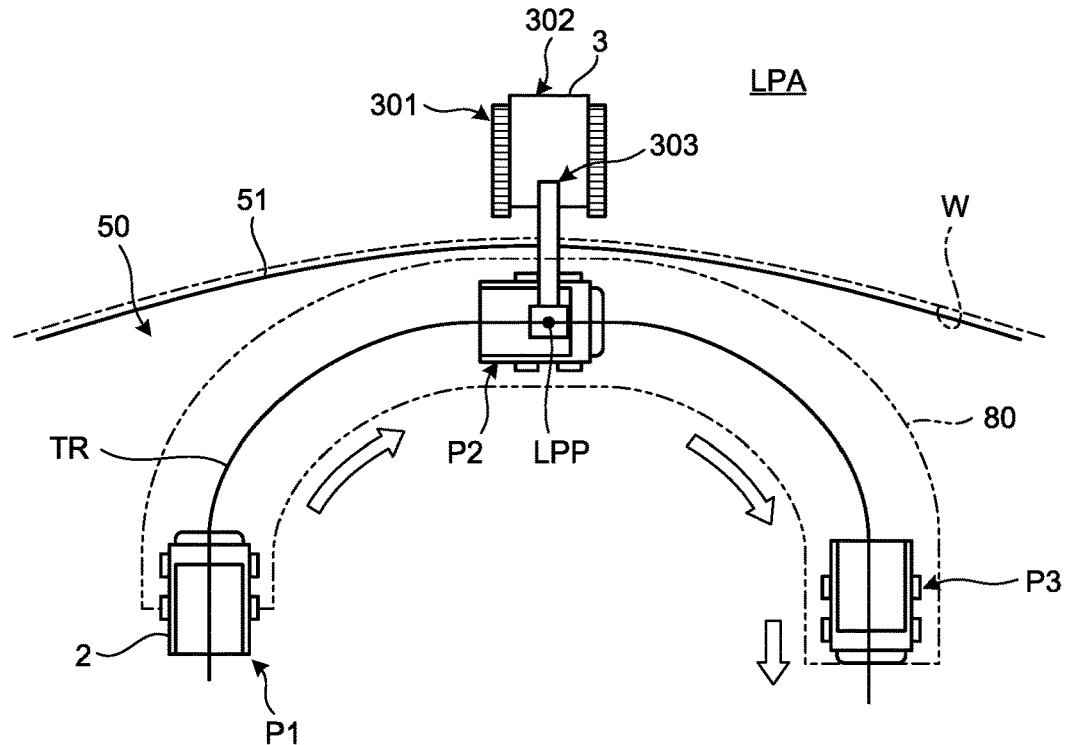
FIG. 4 is a diagram schematically illustrating an example of a service area at a loading ground according to the present embodiments.

The service area setting unit 112 sets a service area 50 (refer to FIG. 4). The service area 50 is an area where the dump truck 2 can serve among the workplace PA and the conveying path HL. The service area 50 is set based on position data acquired by, for example, a measuring vehicle equipped with a GPS while traveling on the workplace PA. In the workplace PA, an outer side of the service area 50 is an area where the dump truck 2 cannot serve and, for example, a wall portion W (refer FIG. 4) and a bank exist therein. The service area setting unit 112 generates service area data 50D indicating the range of the service area 50 to store to the storage device 12.

The passage area setting unit 113 sets a passage area 80 for the dump truck 2 and calculates passage area data 80D indicating the range of the passage area 80. The passage area setting unit 113 can set, as the passage area 80, an area having a predetermined width along the traveling route TR generated by the course data generation unit 111. For example, the passage area setting unit 113 can set, as the passage area 80, a band-shaped area extending in the traveling direction along the traveling route TR centered on this traveling route TR, whose dimension in a width direction (a direction orthogonal to the traveling direction) is larger than the width of the dump truck 2 by a predetermined width. The passage area setting unit 113 can variably set the dimension of the passage area 80 in the width direction. The passage area setting unit 113 stores the calculated passage area data 80D to the storage device 12.

Based on the service area data 50D set by the service area setting unit 112 and the passage area data 80D calculated by the passage area setting unit 113, the judgment unit 114 judges whether the passage area 80 is present on an outer side of the service area 50.

When the passage area 80 is present on the outer side of the service area 50, the outer portion data calculation unit 115 calculates outer portion data 81D indicating the range of an outer portion 81 (refer to FIG. 5) of the passage area 80 present on the outer side of the service area 50. The outer portion data calculation unit 115 stores the calculated outer portion data 81D to the storage device 12.

The update data generation unit 116 generates update data 90D obtained by expanding the service area 50 so as to spread outwardly of the passage area 80. The update data 90D is data to update the service area data 50D. The update data generation unit 116 stores the generated update data 90D to the storage device 12.

The input/output interface 13 outputs, to the dump truck 2, each of the service area data 50D set by the service area setting unit 112, the course data CD generated by the course data generation unit 111, and the passage area data 80D set by the passage area setting unit 113. The service area data 50D, the course data CD, and the passage area data 80D generated by the arithmetic processing device 11 are output to the dump truck 2 via the input/output interface 13 and the communication system 9.

The control device 40 includes a computer system. The control device 40 has an arithmetic processing device 41 including a processor such as a central processing unit (CPU), a storage device 42 including a memory and a storage such as a read only memory (ROM) or a random access memory (RAM), and an input/output interface 43.

The control device 40 is connected to a wireless communication device 44. The wireless communication device 44 is disposed in the dump truck 2. The control device 40 communicates with the management device 10 via the wireless communication device 44 and the communication system 9.

The control device 40 is connected to the driving device 31, a braking device 32, and the steering device 33. The control device 40 is also connected to a position detector 34 and a detection device 35. The driving device 31, the braking device 32, the steering device 33, the position detector 34, and the detection device 35 are equipped in the dump truck 2.

The driving device 31 functions to drive the traveling device 23 of the dump truck 2. The driving device 31 produces a driving force for driving the traveling device 23. The driving device 31 produces a driving force for rotating the rear wheel 25R. The driving device 31 includes, for example, an internal combustion engine such as a diesel engine. Note that the driving device 31 may include a generator that produces electric power by the function of the internal combustion engine and an electric motor that functions based on the electric power produced by the generator.

The braking device 32 functions to brake the traveling device 23. The traveling of the traveling device 23 is decelerated or stopped by the function of the braking device 32.

The steering device 33 functions to steer the traveling device 23 of the dump truck 2. The dump truck 2 is steered by the steering device 33. The steering device 33 steers the front wheel 25F.

The position detector 34 detects the absolute position of the dump truck 2. The position detector 34 includes a GPS antenna that receives a GPS signal from the positioning satellite 5 and a GPS arithmetic calculator that calculates the absolute position of the dump truck 2 based on the GPS signal received by the GPS antenna.

The detection device 35 detects the traveling direction of the dump truck 2. The detection device 35 includes a steering angle sensor 35A that detects a steering angle of the dump truck 2 by the steering device 33 and an azimuth angle sensor 35B that detects an azimuth angle of the dump truck 2. The steering angle sensor 35A includes, for example, a rotary encoder provided in the steering device 33. The azimuth angle sensor 35B includes, for example, a gyro sensor provided on the vehicle body frame 21.

The control device 40 is also connected to an obstacle sensor 36. The obstacle sensor 36 is disposed, for example, at a lower portion of a front portion of the vehicle body frame 21. The obstacle sensor 36 detects an obstacle ahead of the dump truck 2 in a non-contact manner. In the present embodiment, the obstacle sensor 36 includes a plurality of radars and a laser sensor which is a non-contact sensor. The radar emits a radio wave to irradiate an obstacle with this radio wave and receives a radio wave reflected by the obstacle. As a result, the radar can detect a direction and a distance of the obstacle with respect to this radar. The laser sensor is used to detect the position of an object around the dump truck 2. The laser sensor emits a laser beam to irradiate an obstacle, which is an object, with this laser beam and receives a laser beam reflected by the obstacle. As a result, the laser sensor can detect a direction and a distance of the obstacle with respect to this laser sensor. The laser sensor has a higher resolution than that of the radar in order to emit the laser beam and receive the reflected laser beam.

The arithmetic processing device 41 has a cruise control unit 411. Based on the course data CD generated by the course data generation unit 111, the cruise control unit 411 outputs a cruise control signal to control at least one of the driving device 31, the braking device 32, and the steering device 33 of the dump truck 2. The cruise control signal includes an accelerator signal output to the driving device 31, a brake command signal output to the braking device 32, and a steering command signal output to the steering device 33. The arithmetic processing device 41 transmits the position data of the dump truck 2 detected by the position detector 34 to the management device 10 through the wireless communication device 44.

The control device 60 includes a computer system. The control device 60 has an arithmetic processing device 61 including a processor such as a central processing unit (CPU), a storage device 62 including a memory and a storage such as a read only memory (ROM) or a random access memory (RAM), and an input/output interface 63.

The control device 60 is connected to a wireless communication device 64. The wireless communication device 64 is disposed in the loading machine 3. The control device 60 communicates with the management device 10 via the wireless communication device 64 and the communication system 9.

Figure 7:
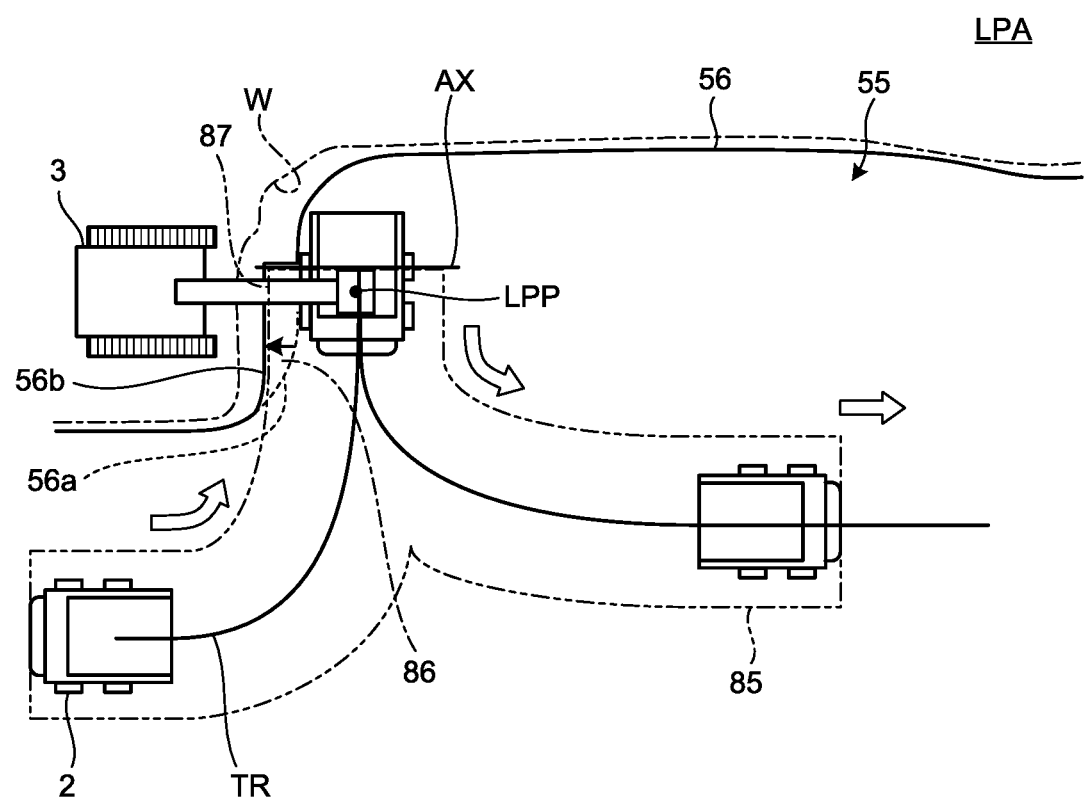
FIG. 7 is a diagram schematically illustrating another example of the service area at the loading ground.

The arithmetic processing device 61 has a loading instruction control unit 611. The loading instruction control unit 611 sets the position of a loading point LPP (refer to FIG. 4) of the cargo for the loading machine 3, the type of a course passing through the loading point LPP, a direction in which the dump truck 2 approaches the loading point LPP, and the orientation of the dump truck 2 at the loading point LPP. In addition, the loading instruction control unit 611 transmits a setting item that has been set to the management device 10 through the wireless communication device 44. Note that examples of the type of a course passing through the loading point LPP include a drive-by type and a switchback type. The course of the drive-by type is, as illustrated in FIG. 4, a course in which the dump truck 2 reaches the loading point LPP with forward movement and starts up with forward movement after the cargo is loaded. The course of the switchback type is, as illustrated in FIG. 7, a course in which the dump truck 2 moving forward turns the advancing direction at an acute angle to reach the LPP with backward movement and starts up with forward movement after the cargo is loaded.

Figure 5:
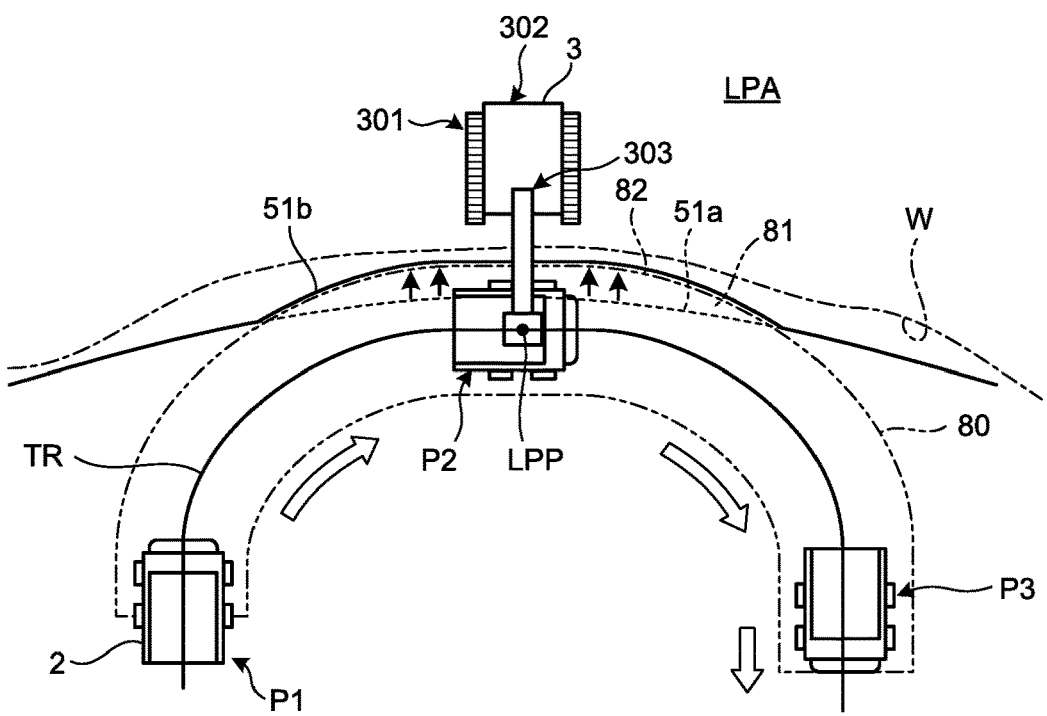
FIG. 5 is a diagram schematically illustrating an example of the service area at the loading ground according to the present embodiments.

FIGS. 4 and 5 are diagrams schematically illustrating examples of the service area 50 at the loading ground LPA according to the present embodiment. As illustrated in FIG. 4, the service area setting unit 112 sets the service area 50. The service area 50 has a boundary line 51. For example, the boundary line 51 is set along the wall portion W.

For example, as illustrated in FIG. 4, when the loading instruction control unit 611 of the loading machine 3 sets the loading point LPP, the type of a course passing through the loading point LPP, and so on, the course data generation unit 111 generates a traveling route TR passing through the loading point LPP. The traveling route TR includes an aggregate of a plurality of course points set at regular intervals. Each of the plurality of course points includes absolute position data of the dump truck 2, traveling speed data of the dump truck 2 at a position where the course point is set, and traveling direction data of the dump truck 2 at a position where the course point is set.

The traveling route TR of the dump truck 2 is defined by a trajectory passing through the plurality of course points. The traveling route TR is set in a line shape. The traveling speed of the dump truck 2 at a position where the course point is set is defined based on the traveling speed data thereat. The traveling direction of the dump truck 2 at a position where the course point is set is defined based on the traveling direction data thereat. The traveling route TR defined by the course point is a target traveling route. The traveling speed of the dump truck 2 defined by the course point is a target traveling speed. The traveling direction of the dump truck 2 defined by the course point is a target traveling direction. Note that, even when the loading point LPP is set on the outer side of the service area 50, the course data generation unit 111 generates the traveling route TR as long as the loading point LPP is located within a predetermined distance of the boundary line 51.

After acquiring the generated traveling route TR, the dump truck 2 travels through the loading ground LPA in accordance with the traveling route TR. In addition, the passage area setting unit 114 sets the passage area 80 on a forward side of the advancing direction of the dump truck 2. Therefore, the dump truck 2 travels with the passage area 80 set on the forward side of the advancing direction.

In the example illustrated in FIG. 4, the course defined by the traveling route TR is, for example, a course (drive-by course) where the dump truck 2 reaches the loading point LPP with forward movement and starts up with forward movement after the cargo is loaded. In this course, for example, the dump truck 2 reaches a position P2 where the loading point LPP is set from a position P1 in the loading ground LPA with forward movement and, after the cargo is loaded, starts up with forward movement to pass through a predetermined position P3. The position P1, the position P2, and the position P3 are positions on the course defined by the traveling route TR. In addition, the position P3 can be set at a spot distant from the loading point LPP by a predetermined distance.

In the loading ground LPA, a part of the wall portion W is mined by the loading machine 3 such as an excavator. In this case, as the mining progresses, the actual position of the wall portion W moves outwardly with respect to the boundary line 51 of the service area 50, as illustrated in FIG. 5. The shape of the wall portion W varies from moment to moment due to the mining in the loading ground LPA in this manner and an area where the dump truck 2 can serve also varies according to the variation in the shape of the wall portion W. Therefore, the service area setting unit 112 needs to update the service area 50 such that the service area 50 corresponds to the variation in the shape of the wall portion W.

In the present embodiment, when the course data generation unit 111 sets the traveling route TR, the passage area setting unit 113 calculates the passage area data 80D indicating the range of the passage area 80 having a predetermined width along this traveling route TR.

The judgment unit 114 judges whether the passage area 80 is present on the outer side of the service area 50 based on the service area data 50D and the passage area data 80D. For example, as illustrated in FIG. 5, when there is a superimposed portion 51a of the boundary line 51 of the service area 50 overlapping the passage area 80, the judgment unit 114 judges that the passage area 80 is present on the outer side of the service area 50. Meanwhile, when there is no superimposed portion 51a of the boundary line 51 of the service area 50 overlapping the passage area 80, the judgment unit 114 judges that the passage area 80 is not present on the outer side of the service area 50. Hereinafter, a case where the passage area 80 is present on the outer side of the service area 50, that is, the passage area 80 has the outer portion 81 on the outer side of the service area 50 will be described as an example. When the passage area 80 is present on the outer side of the service area 50, the outer portion data calculation unit 115 calculates the outer portion data 81D indicating the range of the outer portion 81. In the present embodiment, the outer portion 81 is a boundary update-scheduled area in which the boundary line 51 of the service area 50 is scheduled to be updated.

When the outer portion data 81D is calculated, as illustrated in FIG. 5, the update data generation unit 116 generates the update data 90D (refer to FIG. 3) obtained by expanding the service area 50 according to the range of the outer portion 81 of the passage area 80. The update data 90D is data to update the service area data 50D. The service area 50 defined by the update data 90D has a shape in which the boundary line 51 has a projecting portion 51b. The projecting portion 51b is disposed on the outer side of the passage area 80 and is disposed along an outline 82 of the outer portion 81. As described above, the updated boundary line 51 including the projecting portion 51b is entirely disposed along an outline of the passage area 80. Note that the projecting portion 51b may be disposed at a position overlapping the outline of the outer portion 81. Alternatively, the update data generation unit 116 may set at least a part of the projecting portion 51b within the range of an offset portion of the outer portion 81.

[Control Method]

Figure 6:
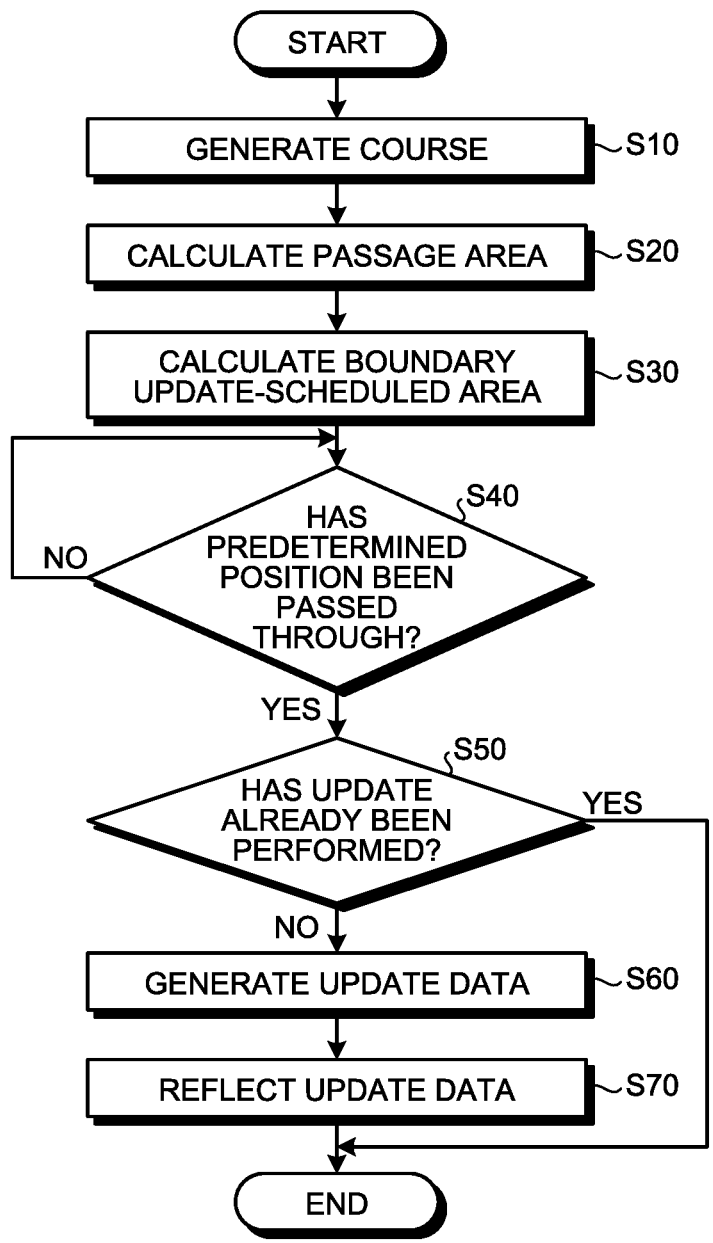
FIG. 6 is a flowchart illustrating an example of a control method for a dump truck according to the present embodiments.

Next, an example of a control method for the dump truck 2 according to the present embodiment will be described. FIG. 6 is a flowchart illustrating an example of the control method for the dump truck 2 according to the present embodiment. When the loading instruction control unit 611 of the loading machine 3 designates the position of the loading point LPP to transmit to the management device 10 via the communication system 9, the course data generation unit 111 of the management device 10 generates the traveling route TR indicating the traveling condition for the dump truck 2 based on the position of the loading point LPP (step S10). The course data generation unit 111 transmits the generated traveling route TR to the dump truck 2 via the communication system 9.

When the dump truck 2 receives the traveling route TR, the cruise control unit 411 causes the dump truck 2 to travel along the traveling route TR. The dump truck 2 moves from the position P1 to the loading point LPP with forward movement and, after the loading is performed at the loading point LPP, starts up with forward movement to pass through the position P3 and then move to the outside from the loading ground LPA. In this case, the cruise control unit 411 transmits a position detected by the position detection unit 34 to the management device 10 via the communication system 9. For example, the above loading work may be performed for a plurality of dump trucks 2. In this case, after the loading for a first dump truck 2 is completed, second and subsequent dump trucks 2 sequentially move to the loading point LPP to perform the loading.

The passage area setting unit 113 calculates the passage area 80 having a predetermined width along the traveling route TR generated by the course data generation unit 111 (step S20).

After the passage area 80 is calculated, the arithmetic processing device 11 calculates the boundary update-scheduled area (step S30). In step S30, the judgment unit 114 first judges whether the passage area 80 is present on the outer side of the service area 50 based on the service area data 50D and the passage area data 80D. When it is judged that the passage area 80 is present on the outer side of the service area 50, the outer portion data calculation unit 115 calculates the outer portion data 81D indicating the range of the outer portion 81 (boundary update-scheduled area). On the other hand, when it is judged that the passage area 80 is not present on the outer side of the service area 50, the processing is ended.

After calculating the outer portion data 81D, the judgment unit 114 judges whether the dump truck 2 has passed through the predetermined position P3 (step S40). The judgment unit 114 makes the judgment in step S40 based on the position transmitted from the dump truck 2. When it is judged that the dump truck 2 has not passed through the predetermined position P3 (No in step S40), the judgment in step S40 is repeated until the dump truck 2 passes through the predetermined position P3.

Meanwhile, when it is judged that the dump truck 2 has passed through the predetermined position P3 (Yes in step S40), the judgment unit 114 judges whether the service area data 50D has already been updated (step S50). In step S50, when the first dump truck 2 passes through a course passing by way of the loading point LPP, the judgment unit 114 judges that the service area data 50D has not been updated (No in step S50). In addition, when the second or subsequent dump truck 2 passes through the course passing by way of the loading point LPP, the judgment unit 114 judges that the service area data 50D has been updated (Yes in step S50).

When the judgment unit 114 judges that the service area data 50D has not been updated (No in step S50), the update data generation unit 116 generates the update data 90D obtained by expanding the service area 50 according to the range of the outer portion 81 of the passage area 80 (step S60). The service area setting unit 112 reflects the generated update data 90D on the service area data 50D (step S70). As a result, the service area 50 is deformed into a shape according to the outer portion 81.

When the judgment unit 114 judges that the service area data 50D has been updated (Yes in step S50), the processing is ended without performing step S60 and step S70.

As described above, the control system 100 for the work vehicle according to the present embodiment includes the course data generation unit 111 that generates the traveling condition including the traveling route TR of the dump truck 2 in the workplace PA, the service area setting unit 112 that sets the service area 50 which is an area where the dump truck 2 is serviceable, the passage area setting unit 113 that sets the passage area 80 having a predetermined width along the traveling route TR generated by the course data generation unit 111, and the update data generation unit 116 that generates the update data 90D for the service area data 50D obtained by expanding the service area 50 when the passage area 80 is present on the outer side of the service area 50.

According to the present embodiment, when the passage area 80 is present on the outer side of the service area 50, since the service area 50 is expanded according to the range of the outer portion 81, the service area 50 can be expanded to an area where the dump truck 2 can travel. As a result, the dump truck 2 can be caused to serve according to a variation in a serviceable area and thus, it is possible to suppress a decrease in productivity at the work site.

In the control system 100 for the work vehicle according to the present embodiment, the update data generation unit 116 generates the update data 90D obtained by expanding the service area 50 so as to spread outwardly of the passage area 80. As a result, the service area 50 can be expanded to a larger area than an area where the dump truck 2 has actually passed.

In the control system 100 for the work vehicle according to the present embodiment, the update data generation unit 116 generates the update data 90D by expanding the service area 50 such that the boundary line 51 of the service area 50 is along the outline 82 of the outer portion 81 and thus, it is possible to suppress the excessive expansion of the service area 50.

In the control system 100 for the work vehicle according to the present embodiment, the update data generation unit 116 generates the update data 90D obtained by deforming the boundary line 51 of the service area 50 such that the boundary line 51 overlaps the outline 82 of the outer portion 81. As a result, it is possible to more reliably suppress the excessive expansion of the service area 50.

The technical scope of the present invention is not limited to the above-described embodiments and appropriate modifications can be made without departing from the spirit of the present invention. For example, a so-called drive-by type course in which the dump truck 2 reaches the loading point LPP with forward movement has been described as an example of the type of a course reaching the loading point LPP, but the course is not limited thereto. For example, a switchback type course in which the dump truck 2 switches back to reach the loading point LPP may be employed as the course.

FIG. 7 is a diagram schematically illustrating another example of the service area 50 at the loading ground LPA.

As illustrated in FIG. 7, the service area setting unit 112 sets a service area 55. A boundary line 56 of the service area 55 is set, for example, along a wall portion W. When the loading instruction control unit 611 of the loading machine 3 sets the loading point LPP, the type of a course passing through the loading point LPP, and so on, the course data generation unit 111 generates a traveling route TR passing through the loading point LPP.

For example, the course defined by the traveling route TR is a course in which the dump truck 2 switches back to the loading point LPP to reach with backward movement. In this case, the dump truck 2 reaches the loading point LPP with backward movement and, after the loading is performed by the loading machine 3 at the loading point LPP, travels from the loading point LPP with forward movement.

In addition, when the course data generation unit 111 sets the traveling route TR, the passage area setting unit 113 calculates the passage area data indicating the range of a passage area 85 for the dump truck 2. Note that a rear end of the dump body 22 is disposed so as to project backward from the rear wheel 25R such that a space is provided between the rear end and the ground. Therefore, the rear end of the dump body 22 can pass through even above a projecting object projecting up to a predetermined height from the ground. Meanwhile, there is a case where it is difficult for the rear wheel 25R to pass through above such a projecting object. As described above, in some areas, even though the rear end of the dump body 22 can pass through, the rear wheel 25R is not always capable of passing through. Therefore, the passage area setting unit 114 does not set the passage area 80 on a backward side of the rotation shaft AX of the rear wheel 25R of the dump truck 2.

The judgment unit 114 judges whether the passage area 85 is present on an outer side of the service area 55 based on the service area data and the passage area data. Hereinafter, a case where the passage area 85 has an outer portion 86 on the outer side of the service area 55 will be described as an example. When the passage area 85 is present on the outer side of the service area 55, the outer portion data calculation unit 115 calculates the outer portion data indicating the range of the outer portion 86.

When the outer portion data is calculated, the update data generation unit 116 generates the update data obtained by expanding the service area 55 according to the range of the outer portion 86 of the passage area 85. The update data is data to update the service area data. The service area 55 defined by the update data has a shape in which the boundary line 56 has a projecting portion 56b. The projecting portion 56b is disposed on the outer side of the passage area 85 and is disposed along an outline 87 of the outer portion 86. The updated boundary line 56 including the projecting portion 56b is entirely disposed along an outline of the passage area 85. Note that the projecting portion 56b may be disposed at a position overlapping an outer periphery of the outer portion 86.

In this manner, also in a case where switchback is used to reach the loading point LPP, since the service area 55 is expanded so as to include at least a part of the outer portion 86 of the passage area 85, the management system 1 for the work vehicle 2 can expand the service area 55 to an area where the dump truck 2 can travel. As a result, the dump truck 2 can be caused to serve according to a variation in a serviceable area and thus, it is possible to suppress a decrease in productivity at the work site.

Note that the above embodiments have assumed that the dump truck 2 is an unmanned dump truck. The dump truck 2 may be a manned dump truck which travels in accordance with the operation by a driver on the dump truck 2.

In addition, the above embodiments have described the work vehicle used in the mine as an example. The constituent elements described in the above embodiments may be applied to a work vehicle used in a work site different from the mine. Furthermore, the work vehicle may not be the dump truck 2 but may be a work vehicle that can carry out loading work, such as a wheel loader.

Meanwhile, in the above embodiments, a configuration in which the course data generation unit 111, the service area data acquisition unit 112, the passage area setting unit 113, the judgment unit 114, the outer portion data calculation unit 115, and the update data generation unit 116 are provided in the management device 10 has been described as an example. However, the present invention is not limited thereto and at least one of the above units may be provided in the control device 40 of the dump truck 2.

In addition, the above embodiments have described an example where data of the traveling route TR is handled as an aggregate of the plurality of course points, but the present invention is not limited thereto. For example, the data may be handled as a curve.

REFERENCE SIGNS LIST

CD COURSE DATA
W WALL PORTION
PA WORKPLACE
HL CONVEYING PATH
CR CRUSHER
AX ROTATION SHAFT
IS INTERSECTION
LPA LOADING GROUND
LPP LOADING POINT
TR TRAVELING ROUTE
1 MANAGEMENT SYSTEM
2 DUMP TRUCK
2F FRONT PORTION
2R REAR PORTION
3 LOADING MACHINE
5 POSITIONING SATELLITE
6 REPEATER
7 CONTROL FACILITY
9 COMMUNICATION SYSTEM
10 MANAGEMENT DEVICE
11, 41, 61 ARITHMETIC PROCESSING DEVICE
12, 42, 62 STORAGE DEVICE
13, 43, 63 INPUT/OUTPUT INTERFACE
14, 44, 64 WIRELESS COMMUNICATION DEVICE
15 INPUT DEVICE
16 OUTPUT DEVICE
21 VEHICLE BODY FRAME
22 DUMP BODY
23 TRAVELING DEVICE
24 TIRE
25 WHEEL
25F FRONT WHEEL
25R REAR WHEEL
31 DRIVING DEVICE
32 BRAKING DEVICE
33 STEERING DEVICE
34 POSITION DETECTOR
35 DETECTION DEVICE
35A STEERING ANGLE SENSOR
35B AZIMUTH ANGLE SENSOR
36 OBSTACLE SENSOR 40, 60 CONTROL DEVICE
50, 55 SERVICE AREA
50D SERVICE AREA DATA
51, 56 BOUNDARY LINE
80D PASSAGE AREA DATA
81D OUTER PORTION DATA
51a, 56a SUPERIMPOSED PORTION
51b, 56b PROJECTING PORTION
80, 85 PASSAGE AREA
81, 86 OUTER AREA
82, 87 OUTLINE
90D UPDATE DATA
100 CONTROL SYSTEM
111 COURSE DATA GENERATION UNIT
112 SERVICE AREA SETTING UNIT
113 PASSAGE AREA SETTING UNIT
114 JUDGMENT UNIT
115 OUTER PORTION DATA CALCULATION UNIT
116 UPDATE DATA GENERATION UNIT
418 CRUISE CONTROL UNIT

The invention claimed is:

1. A control system for a work vehicle, comprising:
a course data generation unit implemented in a processor and configured to generate a traveling condition including a traveling route of the work vehicle in a workplace;
a service area setting unit implemented in a processor and configured to set a service area which is an area where the work vehicle is serviceable;
a passage area setting unit implemented in a processor and configured to set a passage area having a predetermined width along the travelling route generated by the course data generation unit; and
an update data generation unit implemented in a processor and configured to generate update data for the service area data obtained by expanding the service area when the passage area is present on an outer side of the service area, wherein
the update data generation unit generates the update data obtained by expanding the service area so as to spread outwardly of the passage area.

2. A control system for a work vehicle, comprising:
a course data generation unit implemented in a processor and configured to generate a traveling condition including a traveling route of the work vehicle in a workplace;
a service area setting unit implemented in a processor and configured to set a service area which is an area where the work vehicle is serviceable;
a passage area setting unit implemented in a processor and configured to set a passage area having a predetermined width along the travelling route generated by the course data generation unit; and
an update data generation unit implemented in a processor and configured to generate update data for the service area data obtained by expanding the service area when the passage area is present on an outer side of the service area, wherein
the update data generation unit generates the update data obtained by expanding the service area such that a boundary line of the service area is along an outline of the outer portion.

3. A control system for a work vehicle, comprising:
a course data generation unit implemented in a processor and configured to generate a traveling condition including a traveling route of the work vehicle in a workplace;
a service area setting unit implemented in a processor and configured to set a service area which is an area where the work vehicle is serviceable;
a passage area setting unit implemented in a processor and configured to set a passage area having a predetermined width along the travelling route generated by the course data generation unit; and
an update data generation unit implemented in a processor and configured to generate update data for the service area data obtained by expanding the service area when the passage area is present on an outer side of the service area, wherein
the update data generation unit generates the update data obtained by expanding the service area such that a boundary line of the service area overlaps an outline of the outer portion.

4. A control system for a work vehicle, comprising:
a course data generation unit implemented in a processor and configured to generate a traveling condition including a traveling route of the work vehicle in a workplace;
a service area setting unit implemented in a processor and configured to set a service area which is an area where the work vehicle is serviceable;
a passage area setting unit implemented in a processor and configured to set a passage area having a predetermined width along the travelling route generated by the course data generation unit; and
an update data generation unit implemented in a processor and configured to generate update data for the service area data obtained by expanding the service area when the passage area is present on an outer side of the service area, wherein
the update data generation unit generates the update data when the work vehicle passes through a predetermined spot on the traveling route.

5. A work vehicle comprising a control system, comprising:
a course data generation unit implemented in a processor and configured to generate a traveling condition including a traveling route of the work vehicle in a workplace;
a service area setting unit implemented in a processor and configured to set a service area which is an area where the work vehicle is serviceable;
a passage area setting unit implemented in a processor and configured to set a passage area having a predetermined width along the travelling route generated by the course data generation unit; and
an update data generation unit implemented in a processor and configured to generate update data for the service area data obtained by expanding the service area when the passage area is present on an outer side of the service area,
wherein the update data generation unit generates the update data obtained by expanding the service area so as to spread outwardly of the passage area.

6. A control method for a work vehicle implemented by a computer, comprising:
generating a traveling condition including a traveling route of the work vehicle in a workplace;
setting a service area which is an area where the work vehicle is serviceable;
setting a passage area having a predetermined width along the generated traveling route; and
generating update data for the service area data obtained by expanding the service area so as to spread outwardly of the passage area when the passage area is present on an outer side of the service area.

* * * * *